April 3, 1962     H. SAMMONS     3,028,124
MOUNTING SYSTEM OF AIRCRAFT POWER PLANTS
Filed May 16, 1958     5 Sheets-Sheet 1

INVENTOR
HERBERT SAMMONS
ATTORNEYS

April 3, 1962  H. SAMMONS  3,028,124
MOUNTING SYSTEM OF AIRCRAFT POWER PLANTS
Filed May 16, 1958  5 Sheets-Sheet 2

INVENTOR
HERBERT SAMMONS
BY
Stevens, Davis, Miller & Mosher
ATTORNEYS

April 3, 1962 H. SAMMONS 3,028,124
MOUNTING SYSTEM OF AIRCRAFT POWER PLANTS
Filed May 16, 1958 5 Sheets-Sheet 3

INVENTOR
HERBERT SAMMONS
BY
Stevens, Davis, Miller & Mosher
ATTORNEYS

April 3, 1962   H. SAMMONS   3,028,124
MOUNTING SYSTEM OF AIRCRAFT POWER PLANTS
Filed May 16, 1958   5 Sheets-Sheet 4

INVENTOR
HERBERT SAMMONS
BY
Stevens, Davis, Miller & Mosher
ATTORNEYS

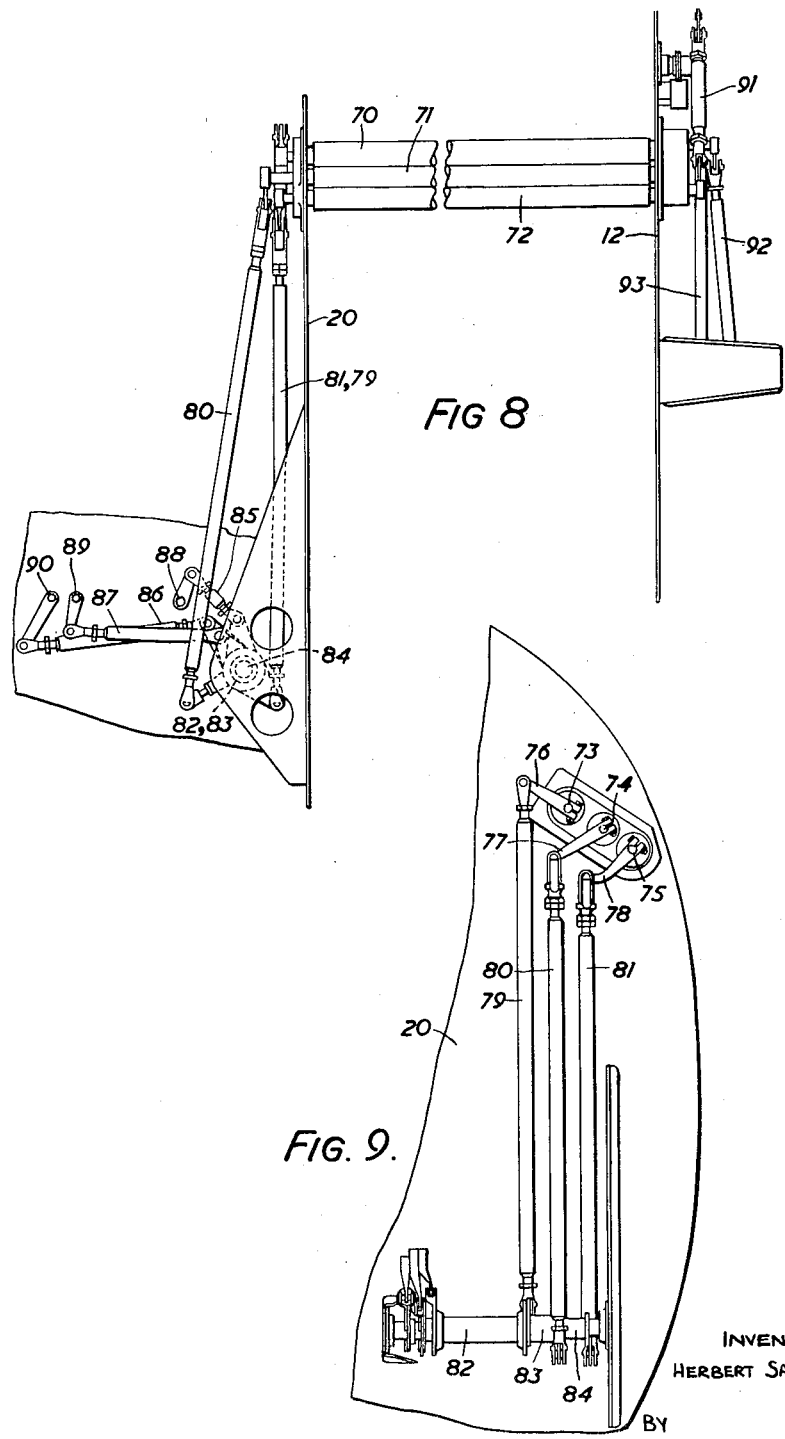

United States Patent Office 3,028,124
Patented Apr. 3, 1962

3,028,124
MOUNTING SYSTEM OF AIRCRAFT
POWER PLANTS
Herbert Sammons, Gerrard's Cross, England, assignor to
D. Napier & Son Limited, London, England, a company of Great Britain
Filed May 16, 1958, Ser. No. 735,784
12 Claims. (Cl. 244—54)

This invention relates to the mounting of aircraft engines in airframes and is particularly concerned with the problem of mounting gas turbine engines in a convenient and readily accessible manner.

It is an object of the invention to provide a method of mounting a gas turbine engine in an aircraft wing wholly in front of a main bulkhead forming part of the airframe.

It is a further object of the invention to provide a mounting system for a gas turbine engine from a main bulkhead in an aircraft wing designed primarily for supporting a reciprocating piston type engine.

It is a further object of the invention to provide a mounting system for a gas turbine engine which will enable the engine to be removed relatively simply either with or without auxiliary mechanisms such as lubricating and fuel supply systems.

It is a further object of the invention to provide an improved exhaust duct system for use with a gas turbine engine mounted in an aircraft wing; and more particularly to provide an exhaust duct system for a gas turbine engine mounted in a nacelle designed primarily for containing a piston engine which will provide an efficient exhaust system without necessitating major rebuilding of the aircraft wing structure.

It is yet another object of the invention to provide an improved air heating system in combination with an aircraft propulsion engine of the gas turbine type.

Now according to the invention a power plant for an aircraft having a wing, comprises a main bulkhead, an engine bulkhead spaced therefrom and a gas turbine engine supported at an intermediate point in its length from the engine bulkhead, and including a cantilever supporting structure between the engine bulkhead and the main bulkhead.

Preferably the cantilever structure is readily detachable from at least one of the two bulkheads, and may comprise a triangulated framework of struts.

According to a preferred feature of the invention the engine is detachably supported from the engine bulkhead and the bulkhead is formed with a central aperture from which the engine can be withdrawn.

The main bulkhead may constitute a structural part of the aircraft wing. In a possible alternative the main bulkhead may be provided as part of the power plant, for attachment to the aircraft wing.

According to another aspect of the invention an aircraft comprises a wing having a main structural bulkhead and includes a gas turbine engine supported at a point in its length adjacent its centre of gravity from an engine bulkhead, and a detachable cantilever structure supporting the engine bulkhead in front of the main bulkhead such that the engine lies wholly in front of the main bulkhead.

In one preferred construction the main bulkhead is formed with an aperture accommodating an exhaust duct which is connectable to the rear end of the engine and the wing includes an exhaust tail pipe leading from this exhaust duct rearwardly through a shallow arched portion to a point at the rear edge of the wing.

The invention may be performed in various different ways but one specific embodiment will now be described by way of example with reference to the accompanying drawings in which FIGURE 1 is a sectional side elevation through a nacelle formed in an aircraft wing showing the main components of the engine and its mounting.

FIGURE 8 is a fragmentary side elevation on an enlarged scale showing some of the mechanical control linkages for the engine passing through the main bulkhead and the engine bulkhead.

FIGURE 9 is a corresponding front elevation on the parts of these linkages lying on the forward side of the engine bulkhead and showing the quick release couplings.

Figure 1:
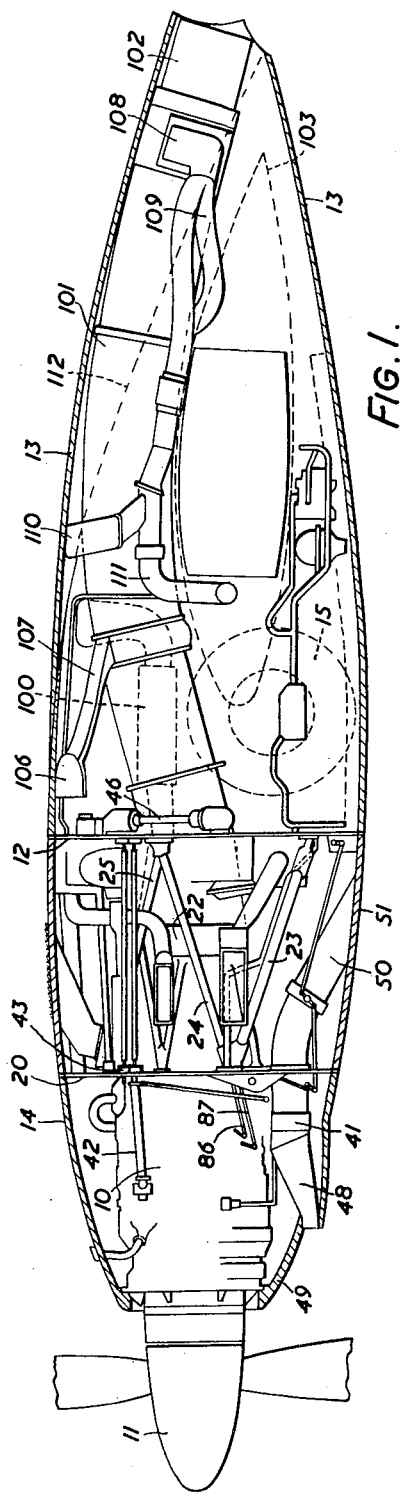

In this particular example the engine illustrated generally at 10 is a gas turbine engine including compressor, combustion chambers, and turbine, the turbo compressor shaft being arranged to drive a propeller 11 at the forward end of the engine through reduction gearing. The engine is mounted on and supported from a main bulkhead 12 forming part of the main air frame of the aircraft wing, and immediately behind this main bulkhead there is provided a nacelle 13 of generally airfoil shape which forms a rearward continuation of the cowling 14 of the engine and which is arranged to house the exhaust tail pipe of the engine and the aircraft landing wheels 15 and retracting mechanism therefor together with various other auxiliary components to be described hereafter.

Figure 2:
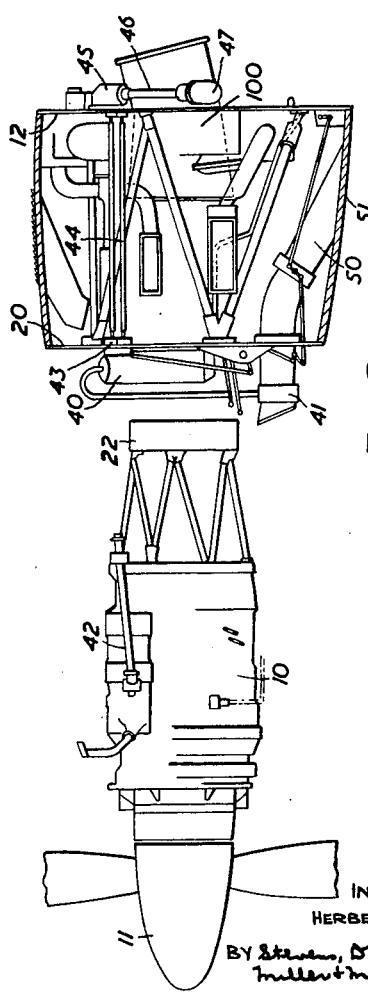
FIGURE 2 is an exploded view showing one method of removing the engine for maintenance.
Figure 3:
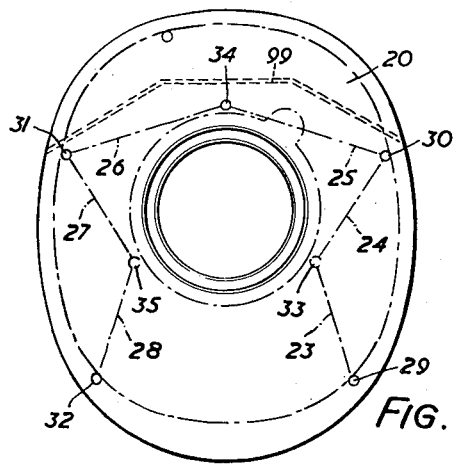
FIGURE 3 is a front elevation of the engine bulkhead showing the arrangement of the cantilever support system between the main bulkhead and the engine bulkhead.
Figure 4:
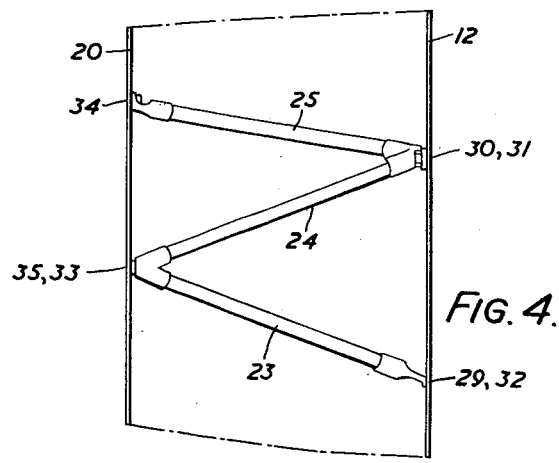
FIGURE 4 is a side elevation of the cantilever support system.

The general mounting system for the engine is illustrated in greater detail in FIGURES 2, 3 and 4. The engine itself is mounted on an engine bulkhead 20 which comprises an elliptical plate with a central circular aperture, the engine being connected to the plate directly by means of three bolts (not shown) spaced around this aperture. The engine bulkhead 20 lies approximately in a plane passing through the centre of gravity of the engine and the mounting system between the engine and the engine bulkhead thus reduces bending moments in the engine itself to a minimum.

The engine bulkhead 20 is in turn supported from the main bulkhead 12 by a cantilever structure so arranged that the whole engine including the turbine lies in front of this main bulkhead. This cantilever structure, illustrated in detail in FIGURES 3 and 4, comprises a system of triangulated stress carrying struts 23, 24, 25, 26, 27, 28. As will be seen from the drawings these struts are anchored to the main bulkhead 12 at four points 29, 30, 31, 32, adjacent the periphery of this bulkhead and are anchored to the engine bulkhead 20 at three points 33, 34, 35 adjacent the edge of the centre aperture formed in the engine bulkhead. At the anchorages 33, 34, 35 a pair of struts are connected to a V-angled socket formed with a flange by which it may be bolted to the bulkhead 20. Thus it will be seen that the cantilever system can be detached from the main bulkhead 12 by removing bolts at points 29, 30, 31 and 32. It will be seen that this cantilever structure thus supports the engine wholly in front of the main bulkhead in a manner which reduces all bending moments in the engine itself and at the same time greatly facilitates access to the engine for maintenance. To this end the cowling 14 is formed in a number of detachable panels and when removed the whole of the engine is open and accessible.

This mounting system provides two alternative methods of removing the engine. In one system the engine itself is removed from the engine bulkhead 20 by disconnecting the three bolts referred to and by disconnecting the turbine exhaust member 22 from the exhaust tail pipe formed in the engine nacelle. It is also necessary to disconnect certain control and supply devices to be described below and the engine can then be removed as shown in FIGURE 2, leaving the engine bulkhead in position with all components attached thereto. These components include amongst others an oil tank 40, an oil cooler 41 and a number of minor components forming part of fluid supply and electrical supply and control linkages which are not illustrated in detail. The engine bulkhead 20 continues to be supported by the cantilever struts 23, 24, 25 etc.

In the alternative method of power plant removal the cantilever support struts 23, 24, 25 etc. are disconnected from the main bulkhead 12 at the points 29, 30, 31 and 32 and after the various control and supply leads have been disconnected adjacent its main bulkhead the whole power plant complete with the engine, the engine bulkhead 20 and all components mounted thereon, is then removed from the front face of the main bulkhead.

The engine is provided with a power take-off drive for accessories such as electric alternators and air blowers, this drive including a shaft 42 which is connected at its forward end to the main reduction gearing of the engine and which passes through the engine bulkhead 20 where it is supported in an intermediate bearing 43, the rear end of the shaft being provided with a universal joint and a quick release coupling by which it is connected to a further transmission shaft 44 extending rearwardly through the main bulkhead 12 where it is connected to an auxiliary gear box 45. The shafts 42 and 43 are surrounded by a cylindrical shield, which acts as an anti-flail protector, and is also readily releasable from the bulkheads. The gear box 45 is rigidly connected to an electric generator and alternator and is also connected through a shaft 46 to a blower 47 arranged to provide pressurised air to the main cabin of the aircraft. The shaft 44 is provided with release couplings at both ends and can thus be readily detached from the forward shaft section 42 or from the gear box 45.

The oil cooler 41 is positioned in a cooling air duct including an air intake scoop 48 attached to a cowling section 49, and an exhaust duct 50 which passes through the engine bulkhead 20 and has an exit aperture in a rear cowling section 51. The air intake scoop 48 is readily detachable from the oil cooler 41 and the cowling 49 is also readily detachable from the engine. Thus in an engine removal the cowling 49 is first detached and the engine is then disconnected from the oil cooler 41.

Figure 6:
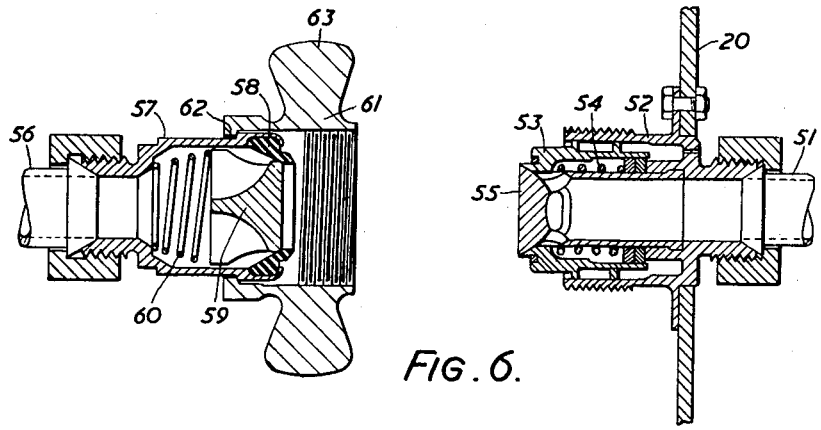
FIGURE 6 is an exploded sectional side elevation on an enlarged scale of two complementary parts of a quick release coupling in a fuel supply line adjacent the engine bulkhead.
Figure 7:
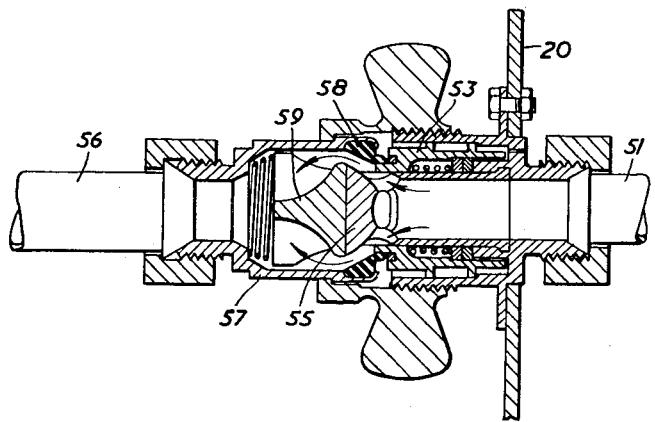
FIGURE 7 is a sectional side elevation showing the two parts of the fuel coupling in their close coupled position.

One of the fuel supply quick release couplings is illustrated in FIGURES 6 and 7, this coupling being mounted adjacent the engine bulkhead 20. A fuel supply conduit 51 extends through the main bulkhead 12 and is rigidly connected to the half coupling illustrated in the right hand half of FIGURE 6. This coupling comprises an outer externally screwthreaded member 52, an intermediate sliding sleeve 53 which is spring urged towards the front of the power plant by a spring 54 and an inner rigid hollow spigot 55 which has a hemispherical forward end against which the intermediate sleeve 53 abuts to form a fluid tight sleeve in the position illustrated.

The other half coupling is connected to a fluid supply conduit 56 which leads forwardly to the engine itself, this half coupling comprising a hollow duct 57 formed with an inwardly extending lip 58 at its rear end and housing a movable plug 59 which is urged rearwardly by a spring 60 and forms a fluid tight seal with the lip in the position illustrated. The duct 57 is surrounded by a further hollow sleeve 61 having a shallow flange 62 engaging a shoulder on the duct 57 and formed with wings 63. In the positions illustrated in FIGURE 6 both ducts 51 and 56 are thus closed by the plugs 55 and 59.

To connect the coupling the hollow wing nut sleeve 61 is engaged with the screwthread on the fixed outer sleeve 52 and rotated to cause the two half couplings to move axially towards one another. The rigid plug 55 then engages the plug 59 and forces this moving plug forwardly in relation to the duct 57 thus opening the passage between the plug 59 and the lip 58. At the same time a part of the lip 58 engages the movable sleeve 53 and causes this sleeve to move rearwardly in relation to the plug 55 against the spring 54, thus opening an annular gap between the plug 55 and the sleeve 53. When fully engaged fuel can then flow through an annular passage around the mating plugs 55, 59 as shown in FIGURE 7.

Similar quick release couplings may be fitted at the rear end of the fuel supply conduit 51 where it passes through the main bulkhead 12 permitting the fuel supply line to be broken in rear of the engine bulkhead 20 when a full power plant removal is effected.

Some of the mechanical control linkages are illustrated in FIGURES 8 and 9. These comprise three torque shafts 70, 71, 72 extending between the main bulkhead 12 and the engine bulkhead 20 and mounted in bearings attached to these bulkheads. The front ends of these torque shafts are formed with spindles 73, 74, 75 to which are connected respectively lever arms 76, 77, 78, by quick release pinch bolts as shown, these lever arms being pivotally connected to vertical links 79, 80, 81 which are in turn connected by lever arms to three hollow coaxial lay shafts 82, 83, 84. The inner ends of these lay shafts are connected through further pivoted links 85, 86, 87 to control shafts 88, 89, 90 attached to the engine. In this particular example the three control systems are arranged to control the engine throttle, an engine r.p.m. override device and a high pressure cock. The rear ends of the torque tubes 70, 71, 72 where they pass through the main bulkhead 12 are connected by similar pivoted control linkages 91, 92, 93 to control levers situated in the main aircraft structure.

Means are provided for quickly disconnecting each of these linkages either forward of the engine bulkhead 20 or adjacent the main bulkhead 12. For an engine removal the links 85, 86, 87 are disconnected from the arms attached to the shafts 88, 89, 90, their connections being simple fork and pin assemblies. Alternatively by freeing the pinch bolts the lever arms 76, 77, 78 can quickly be slid off their spigots 73, 74, 75 and similar disconnections can be made at the rear side of the main bulkhead 12. Thus in an engine removal the linkages will preferably be disconnected forward of the engine bulkhead 20 adjacent the engine itself, while for a main power plant they will be disconnected at the main bulkhead 12.

The power plant also includes a detachable generally horizontal fire wall or bulkhead 99 extending between the two bulkheads 12 and 20, above the level of the turbine. The majority of the control linkages, fuel and oil supply lines, and auxiliary components and drives, are situated above this bulkhead, and therefore shielded from the turbine. The bulkhead 99 is indicated in chain lines in FIGURE 3, and it will be seen that it includes two inclined side portions, both ends of the bulkhead being readily releasable from the bulkheads 12 and 20 by a series of screwthreaded bolts.

The power plant installation also includes a special arrangement of exhaust ducting leading from the outlet of the turbine to a point in the rear end of the engine nacelle 13. This ducting includes a front section 100 which passes through a central aperture in the main bulkhead 12 and at its forward end is provided with a coupling by which it can be readily attached to the member 22 at the rear end of the turbine. This coupling is illustrated in detail in FIGURES 10 and 11. The exhaust ducting extends rearwardly through a curved shallow arched portion indicated generally at 101 in FIGURE 1 and is formed with an exhaust outlet 102 at the rear end of the nacelle. It will be noted that the ducting thus passes above the main spar structure of the wing from which the nacelle is supported, a chord section of the wing being illustrated in chain lines at 103 in FIGURE 1.

Figure 10:
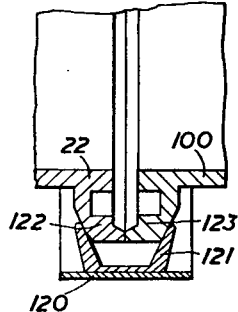
FIGURE 10 is a scrap sectional view on an enlarged scale showing the quick release coupling between the turbine exhaust casing of the engine and the exhaust ducting section extending rearwardly of the main bulkhead to the exhaust nozzle 102.
Figure 11:
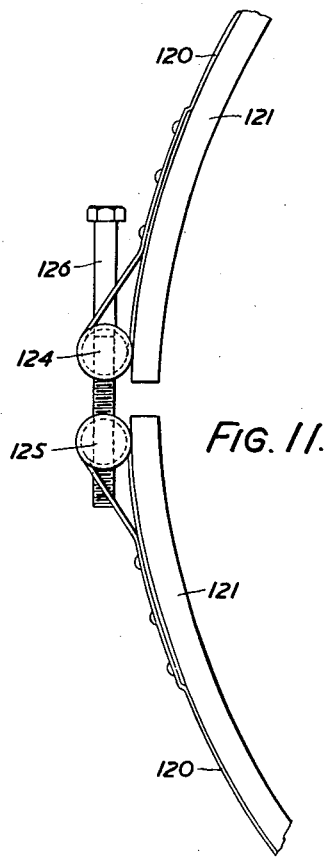
FIGURE 11 is a scrap front elevation on the quick release circlip incorporated in the coupling illustrated in FIGURE 10.

The coupling illustrated in FIGURES 10 and 11 comprises a flexible steel tension band 120 on which are mounted a series of channel section segments 121, the internal surfaces of the channel flanges being tapered towards the base of the channel as illustrated in FIGURE 10. The turbine exhaust casing 22 is formed at its rear end with a radial flange 122 while the exhaust duct section 100 is formed with a corresponding radial flange 123. Thus two flanges 122 and 123 each have inclined annular surfaces which cooperate with the tapered internal surfaces on the channel segments 121. The tension band 120 is connected at each of its ends to transverse pins 124, 125 each formed with a screwthreaded drilling to receive a tension bolt 126. When this bolt is tightened to apply tension to the band 120 the segments 121 are drawn inwards thus wedging the two flanges 122, 123 into close sealing engagement with one another. The coupling can readily be disengaged merely by slackening the bolt 126.

Figure 5:
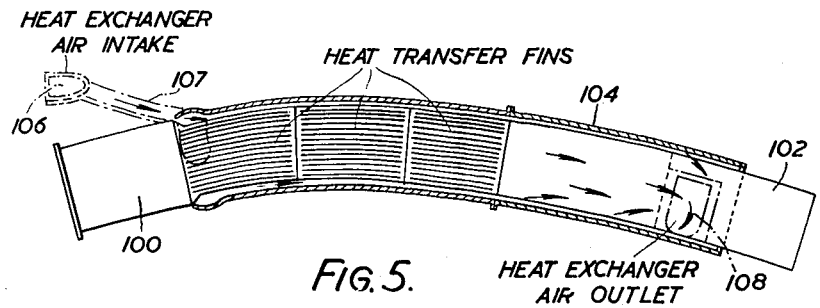
FIGURE 5 is a fragmentary sectional side elevation of the air heat exchanger incorporated with the exhaust tail pipe.

The exhaust ducting also incorporates a heat exchanger for warming air to be delivered to de-icing equipment or to the main cabin of the aircraft. The heat exchanger is illustrated in FIGURE 5 and comprises a jacket 104 surrounding the exhaust duct itself, the outer surface of the duct being formed with a series of closely spaced longitudinally extending heat transfer fins 105. Air is passed through the annular space between the fins and the jacket 104 being received from an air intake 106 whence it is delivered to the upstream end of this annular passage through a duct 107. The hot air emerging from the heat exchanger is delivered through an outlet 108 and is supplied thence to the various points of use through air trunks 109, 110 and 111.

The nacelle 13 is generally of pear drop shape the general profile of its upper surface being illustrated in chain lines at 112 in FIGURE 1. It will be appreciated that the distance between this profile 112 and the profile of the main wing 103 is extremely limited towards the rear end of the main nacelle and the rear end of the exhaust ducting within the nacelle is mounted in a banana shaped protrusion rising above the general profile of the rear end of the nacelle and faired into the side walls of the nacelle in streamlined manner.

What I claim as my invention and desire to secure by Letters Patent is:

1. An aircraft power plant and mounting system including a gas turbine engine comprising a compressor, combustion chambers and turbine, a casing means completely surrounding and enclosing said compressor, combustion chambers and turbine, and an engine bulkhead formed with a central aperture, said gas turbine engine casing being detachably mounted and supported within the aperture formed in said engine bulkhead with the central axis of the engine normal to the plane of said bulkhead and with at least part of the compressor in said casing extending forwardly of said bulkhead and said turbine in said casing extending rearwardly of said bulkhead and including a cantilever supporting structure for said casing secured to said engine bulkhead and extending rearwardly beyond the rear end of said turbine.

2. A power plant as claimed in claim 1 in which the cantilever structure is readily detachable from the engine bulkhead.

3. A power plant as claimed in claim 1 in which said aperture in said bulkhead is dimensioned to permit said engine to be withdrawn therethrough.

4. A power plant and mounting system for an aircraft comprising a wing having a main structural bulkhead and including a gas turbine engine comprising a compressor, combustion chambers and turbine and a propeller forward of said compressor and coupled to said compressor and turbine, an engine bulkhead formed with a central aperture, the gas turbine engine being mounted on and supported within said aperture in said engine bukhead such that its center of gravity lies approximately in the plane of the engine bulkhead, and including a detachable cantilever structure connected to the engine bulkhead and to the main structural bulkhead such that the engine lies wholly in front of the main bulkhead, the main bulkhead being formed with an aperture accommodating an exhaust duct which is connectable to the ear end of the turbine and includnig an exhaust tail pipe leading from said exhaust duct rearwardly through a shallow arched portion to a point at the rear edge of the wing.

5. An aircraft power plant as claimed in claim 4 including a power take-off shaft from the engine passing through the engine bulkhead, and auxiliary equipment mounted on the main bulkhead and driven by the power take-off shaft, and in which the power take-off shaft is formed in at least two separable parts.

6. A power plant as claimed in claim 5 in which the power take-off shaft is capable of being separated at a point between the engine and the engine bulkhead.

7. An aircraft as claimed in claim 4 in which the tailpipe is provided with a surrounding jacket and including an air inlet duct leading to the jacket at one end thereof and a warm air outlet duct leading from the other end of the jacket.

8. An aircraft as claimed in claim 7 in which the external surface of the tail pipe within the jacket is provided with a series of radiator fins.

9. An aircraft as claimed in claim 4 in which the cantilever structure is readily disconnectable from the main bulkhead and the engine bulkhead.

10. An aircraft as claimed in claim 4 in which the engine is readily disconnectable from the engine bulkhead and the engine bulkhead is formed with a central aperture of sufficient dimensions to permit the engine to be withdrawn therefrom.

11. An aircraft as claimed in claim 4 in which the cantilever supporting structure comprises a triangulated system of struts connected to the main bulkhead at points adjacent the periphery thereof and connected to the engine bulkhead at points adjacent the external wall of the engine.

12. An aircraft as claimed in claim 4 in which the engine bulkhead comprises fire resistant material.

References Cited in the file of this patent
UNITED STATES PATENTS

| | | |
|---|---|---|
| 2,488,174 | Clegern | Nov. 15, 1949 |
| 2,539,960 | Marchant | Jan. 30, 1951 |
| 2,589,539 | Childress | Mar. 18, 1952 |
| 2,605,851 | Gleason | Aug. 5, 1952 |
| 2,711,866 | Bentz | June 28, 1955 |
| 2,722,391 | Krieghoff | Nov. 1, 1955 |
| 2,965,338 | McLean | Dec. 20, 1960 |